(12) United States Patent
Minh et al.

(10) Patent No.: US 8,547,093 B2
(45) Date of Patent: Oct. 1, 2013

(54) METHODS AND SYSTEMS FOR APPLYING SPEED CORRECTION FITS TO NMR WELL LOGGING FORMATION ECHO DATA WITH SINGULAR VALUE DECOMPOSITION

(75) Inventors: Chanh Cao Minh, Katy, TX (US); Jack LaVigne, Houston, TX (US); Steve Crary, Houston, TX (US); Henry N. Bachman, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 458 days.

(21) Appl. No.: 12/846,995

(22) Filed: Jul. 30, 2010

(65) Prior Publication Data

US 2012/0025820 A1 Feb. 2, 2012

(51) Int. Cl.
*G01V 3/32* (2006.01)
(52) U.S. Cl.
USPC .......................................... 324/303; 324/306
(58) Field of Classification Search
USPC .. 324/300–322; 600/407–435; 382/128–131
See application file for complete search history.

(56) References Cited

U.S. PATENT DOCUMENTS

| 5,486,762 | A  | * | 1/1996  | Freedman et al. | 324/303 |
|-----------|----|---|---------|-----------------|---------|
| 6,232,778 | B1 |   | 5/2001  | Speier          |         |
| 7,196,516 | B2 | * | 3/2007  | Blanz et al.    | 324/303 |
| 7,339,374 | B2 | * | 3/2008  | Blanz           | 324/303 |
| 7,358,725 | B2 | * | 4/2008  | Blanz           | 324/303 |
| 2006/0033491 | A1 | * | 2/2006 | Blanz et al. | 324/303 |
| 2006/0273787 | A1 | * | 12/2006 | Blanz | 324/303 |
| 2007/0222443 | A1 | * | 9/2007 | Blanz | 324/303 |
| 2010/0066366 | A1 | * | 3/2010 | Cochrane et al. | 324/310 |
| 2011/0204892 | A1 | * | 8/2011 | Li et al. | 324/309 |
| 2012/0025820 | A1 | * | 2/2012 | Minh et al. | 324/303 |

OTHER PUBLICATIONS

Freedman, et al., "Processing of Data from an NMR Logging Tool," SPE 30560 (Oct. 1995).

* cited by examiner

*Primary Examiner* — Melissa Koval
*Assistant Examiner* — Tiffany Fetzner
(74) *Attorney, Agent, or Firm* — Kenneth Liu; Jeremy Berman

(57) ABSTRACT

A method and system for performing speed correction on nuclear magnetic resonance logging data is provided. The speed correction performed can be done on a representation of echo data received by a logging tool, and then additively applied to the echo data. Such a process can reduce or remove the amplification of noise in the echo data that is common in conventional methods of speed correction.

18 Claims, 6 Drawing Sheets

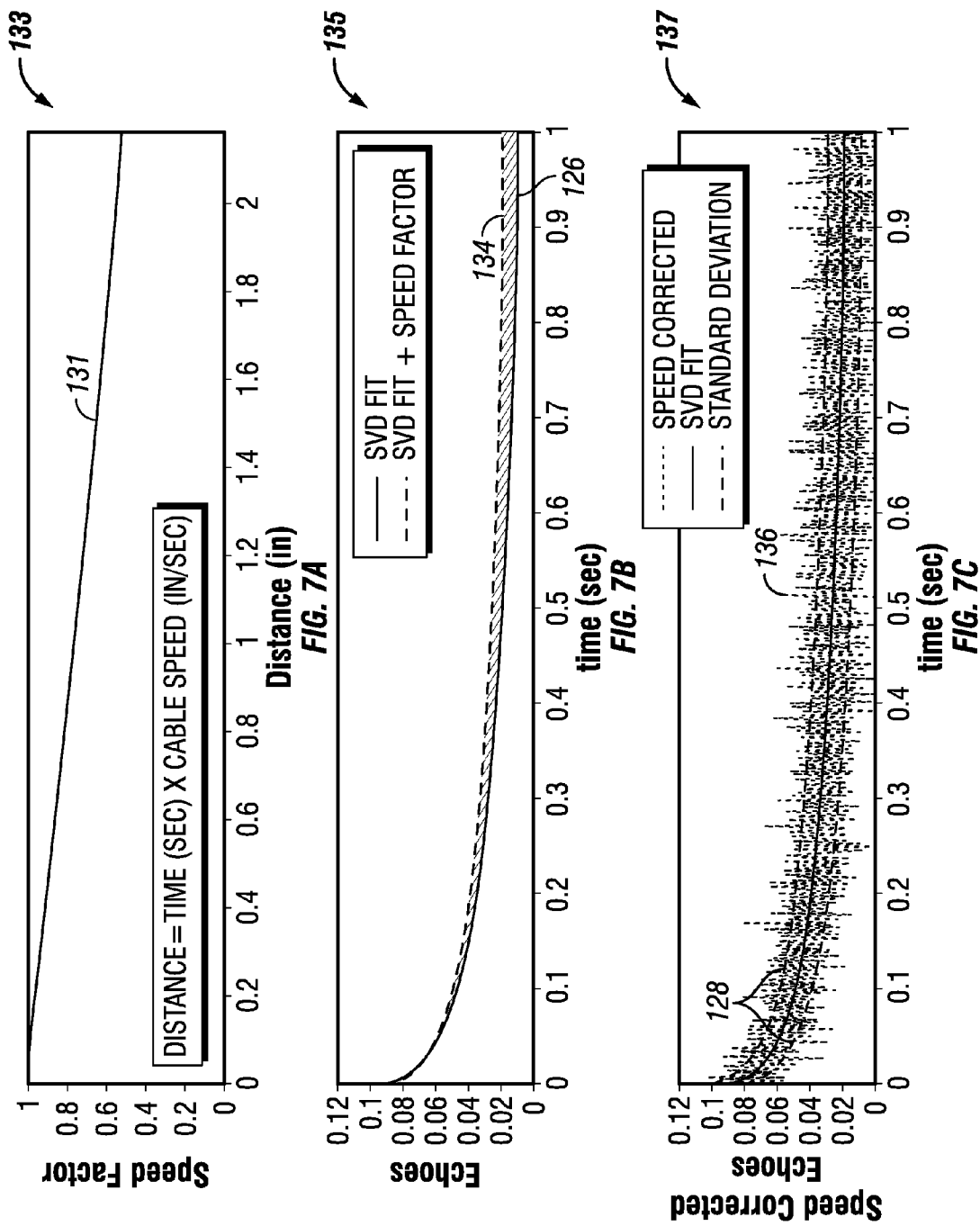

METHODS AND SYSTEMS FOR APPLYING SPEED CORRECTION FITS TO NMR WELL LOGGING FORMATION ECHO DATA WITH SINGULAR VALUE DECOMPOSITION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of obtaining nuclear magnetic resonance (NMR) measurements from rock formations. More specifically, the invention relates to methods for applying improved speed correction to echo data received by an NMR tool.

2. Background Art

Nuclear magnetic resonance (NMR) can be used to determine various characteristics of subsurface formations and/or samples. NMR logging tools can be used downhole to obtain these characteristics, which then can be used to assist in the determination of, for example, the presence, absence, and/or location of hydrocarbons in a given formation or sample.

Conventional NMR logging, well known in the art, generally involves deploying in a wellbore an NMR instrument, which uses magnetic fields to generate and detect various RF signals from nuclei in a formation or sample. Certain exemplary NMR techniques are described in U.S. Pat. No. 6,232,778 assigned to Schlumberger Technology Corp., the entire disclosure of which is hereby incorporated by reference.

NMR measurements, in general, are accomplished by causing the magnetic moments of nuclei in a formation to precess about an axis. The axis about which the nuclei precess may be established by applying a strong, polarizing, static magnetic field $B_0$ to the formation, such as through the use of permanent magnets. This field causes the proton spins to align in a direction parallel to the applied field (this step, which is sometimes referred to as the creation of longitudinal magnetization, results in the nuclei being "polarized"). Polarization does not occur immediately, but instead grows in accordance with a time constant $T_1$, and may take as long as several seconds to occur. After sufficient time, a thermal equilibrium polarization parallel to $B_0$ has been established.

Next, a series of radio frequency (RF) pulses are produced so that an oscillating magnetic field, $B_1$, is applied. The first RF pulse (referred to as the 90-degree pulse) must be strong enough to rotate the magnetization from $B_0$ substantially into the transverse plane (i.e., transverse magnetization). Additional RF pulses (often referred to as 180-degree pulses) are applied to create a series of spin echoes. The frequency of the RF pulses is chosen to excite specific nuclear spins of a particular region of the sample that is being investigated.

Two time constants are associated with the relaxation processes of the longitudinal and transverse magnetization: $T_1$ and $T_2$. The spin-lattice relaxation time ($T_1$) is the time constant for longitudinal magnetization to return to its thermal equilibrium value in the static magnetic field. The spin-spin relaxation time ($T_2$) is the time constant for the transverse magnetization to return to its thermal equilibrium value which is zero.

The spin echoes (also known as "echoes" or "echo data") collected by conventional NMR logging tools are normally inverted and then displayed in relaxation or $T_2$ space. Various conventional methods exist for inverting spin echoes to be displayed in $T_2$ space, such as those described in Freedman, R. and Morriss, C. E.: *Processing of Data From an NMR Logging Tool*, SPE 30560 (October 1995).

One issue arising in conventional NMR logging tools is that the movement of the tool in the downhole environment affects the $T_2$ relaxation time reported by the tool. FIGS. 1A-1C are diagrams showing a conventional NMR logging tool 120 disposed within a borehole 11 or wellbore at three different time periods. The tool 120 shown in FIG. 1 is in the process of making measurements and upwardly-traversing the borehole 11 in the formation 106. As can be seen in FIG. 1, the NMR tool 120 includes a magnet 108 used for creating the magnetic field that can cause transverse magnetization in a given region 110. As the tool 120 moves upward, the region 110 correspondingly moves upward. Accordingly, by the time the tool 120 has moved from the first time period shown in FIG. 1A to the last time period shown in FIG. 1C, the region 110 over which the tool 120 is applying the magnetic fields and detecting the corresponding response has shifted. This motion of the instrument affects the $T_2$ relaxation time reported by the NMR tool 120, as some of the polarized material moves out of the sample region 110. This issue is often referred to as a "speed effect."

The speed effect occurring in conventional NMR tools can reduce the amplitude of the echoes as a function of time. This can cause the reported $T_2$ distribution to be artificially shifted to slightly earlier times. The speed effect is more pronounced as the speed of the tool's 120 movement up the borehole 11 is increased. FIG. 2 is a graph depicting the speed effect of a conventional NMR logging tool 120 at three different speeds. The same interval was logged using different cable speeds—at 250 feet per hour 112, 1000 feet per hour 114, and 1800 feet per hour 116—for the data shown in FIG. 2. The shift to earlier decay time at faster logging speeds is easily seen.

Attempts have been made to correct for the speed effect in NMR measurements. Conventional speed correction methods include applying multiplicatively a correction factor that varies over time to the echoes received by the tool 120. Depending on how the correction factor is calculated, the multiplicative application of the correction factor can include dividing the echo data received by the correction factor or multiplying the echo data by the correction factor. FIG. 3 includes three graphs illustrating the effect of applying a conventional speed correction method. The first graph 118 in FIG. 3 shows the measured echoes 124 and a Single Value Decomposition (SVD) 126 fit of those echoes. The SVD will be discussed in more detail below. As can be seen in this graph 118, there is some noise in the echo data 124, as some of the echoes 124 periodically vary greatly (i.e., beyond a standard deviation 128) from the fit line.

The second graph 121 in FIG. 3 shows a speed correction factor 131 that varies over time that can be applied to the echo data 124. Determining the correction factor 131 depends on the speed of the measurement, the time taken for the measurement (e.g. number of echoes and echo spacing), the polarization/$T_1$ times of the protons/nuclei, and the details of the tool 120 design, as is recognized by one of ordinary skill in the art.

The third graph 122 in FIG. 3 shows the echo data 132 and SVD line 126 with the speed correction factor 131 applied. Dividing the echo data 124 by this factor 131 corrects for the speed effect, by shifting the signal decay later in time and thereby compensating for the artificial shortening caused by the speed effect. However, conventional methods such as this have the unwanted effect of also increasing the noise inherent in the signal.

Accordingly, there is a need in the art for methods and systems for applying speed correction that overcome one or more of the deficiencies that exist with conventional methods.

SUMMARY OF THE INVENTION

In one aspect, a method for correcting NMR logging data is provided. The method can include the steps of applying a multiplicative speed correction factor to a fit of echo data comprising a plurality of echo points, determining a difference between the fit and the fit with the multiplicative speed correction factor applied, and applying additively the difference to a representation of the echo data to yield additively-corrected echo data.

In another aspect, an apparatus for analyzing an NMR characteristic of a formation is provided. The apparatus can include an NMR tool for receiving echo data comprising a plurality of echo points from the formation, a first processor in communication with the NMR tool to apply a multiplicative speed correction factor to a fit of the echo data, a second processor in communication with the first processor to determine a difference between the fit and the fit with the multiplicative speed correction factor applied, and a third processor in communication with the second processor to apply additively the difference to a representation of the echo data to yield additively-corrected echo data.

In another aspect, a computer program product include a computer-readable medium having computer-readable program code embodied therein for correcting NMR logging data is provided. The computer-readable program code in the computer program product can include computer-readable program code for applying a multiplicative speed correction factor to a fit of echo data comprising a plurality of echo points, computer-readable program code for determining a difference between the fit and the fit with the multiplicative speed correction factor applied, and computer-readable program code for applying additively the difference to a representation of the echo data to yield additively-corrected echo data.

Other aspects and advantages of the invention will be apparent from the following description and the appended claims.

BRIEF DESCRIPTION OF THE DRAWINGS

FIG. 7 is a set of three graphs illustrating the effect of applying a speed correction method according to an exemplary embodiment.

DETAILED DESCRIPTION

The invention provides improved speed correction for NMR logging tools that reduces or removes the amplification of noise in the echoes. A method and system for applying improved speed correction to echoes received by an NMR tool 120 will now be described with reference to FIGS. 4-7, which depict representative or illustrative embodiments of the invention.

Figure 4:
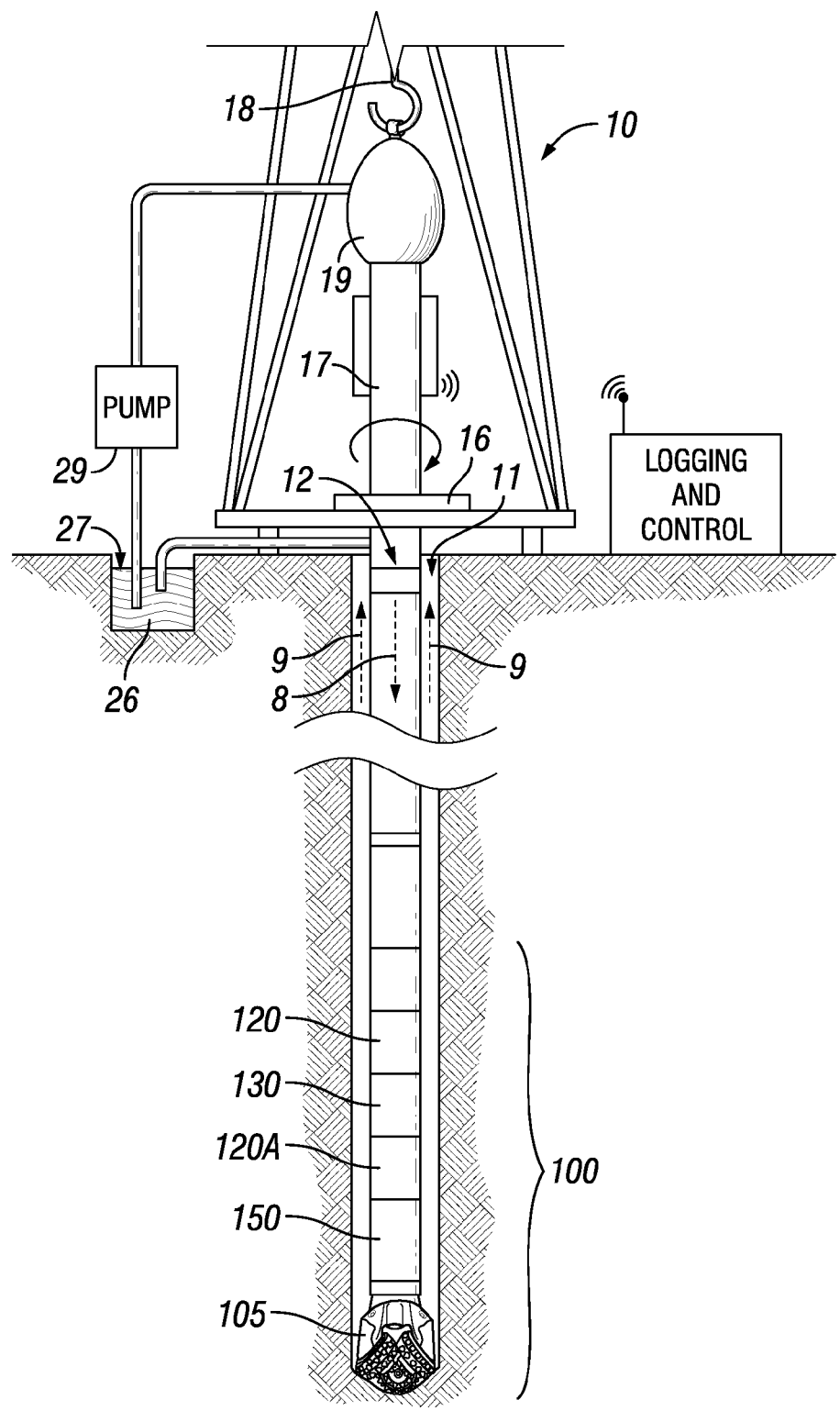
FIG. 4 illustrates a wellsite system in which the present invention can be employed, according to an exemplary embodiment.

FIG. 4 illustrates a wellsite system in which the present invention can be employed. The wellsite can be onshore or offshore. In this exemplary system, a borehole 11 is formed in subsurface formations 106 by rotary drilling in a manner that is well known. Embodiments of the invention can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a travelling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole 11, as indicated by the directional arrows 9. In this well known manner, the drilling fluid lubricates the drill bit 105 and carries formation 106 cuttings up to the surface as it is returned to the pit 27 for recirculation.

In various embodiments, the systems and methods disclosed herein can be used with any means of conveyance known to those of ordinary skill in the art. For example, the systems and methods disclosed herein can be used with an NMR tool conveyed by wireline, slickline, drill pipe conveyance, and/or a while-drilling conveyance interface. For the purpose of an example only, FIG. 4 depicts a while-drilling interface. However, systems and methods disclosed herein could apply equally to wireline or any other suitable conveyance means. The bottom hole assembly 100 of the illustrated embodiment includes a logging-while-drilling (LWD) module 120, a measuring-while-drilling (MWD) module 130, a roto-steerable system and motor 150, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a nuclear magnetic resonance measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

Figure 5:
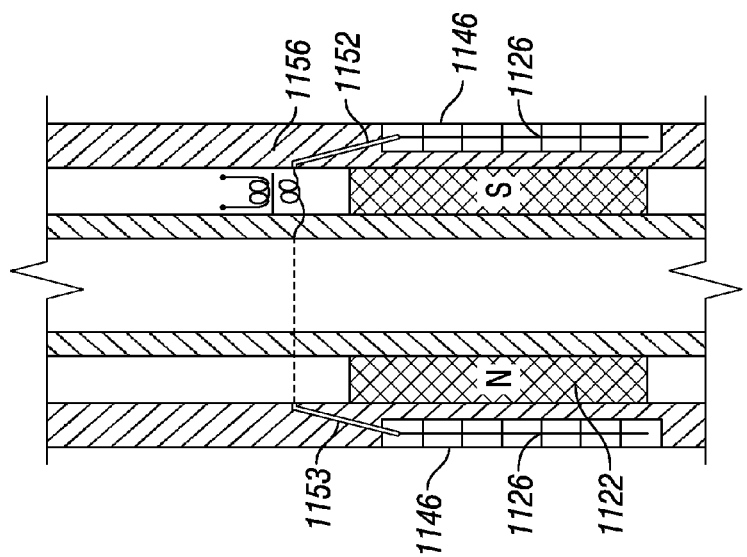
FIG. 5 shows an embodiment of a type of device for formation evaluation while drilling using NMR, according to an exemplary embodiment.

FIG. 5 shows an embodiment of a type of device described in U.S. Pat. No. 5,629,623 for formation evaluation while drilling using NMR, incorporated herein by reference, it being understood that other types of NMR/LWD tools can also be utilized as the LWD tool 120 or part of an LWD tool suite 120A. As described in the '623 patent, an embodiment of one configuration of the device comprises a modified drill collar having an axial groove or slot 1150 that is filled with ceramic insulator, and contains RF antenna 1126, which is protected by a non-magnetic cover 1146, and produces and receives pulsed RF electromagnetic energy. The conductors of the RF antenna are grounded at one end to the drill collar. At the other end, the conductors are coupled to an RF transformer 1156 via pressure feed-throughs 1152 and 1153. The transformer 1156 keeps a 180° phase difference between the currents in diametrically opposite RF conductors. A cylindrical magnet 1122 (a type of magnet 108) produces a static magnetic field in the formations 106. The RF antenna can also be arranged so that the drill collar itself produces the oscillating RF magnetic field. The oscillating RF magnetic field, which excites nuclei of substances in the formations 106, is axially symmetric, to facilitate measurements during rotation of the drill string.

Figure 1A:
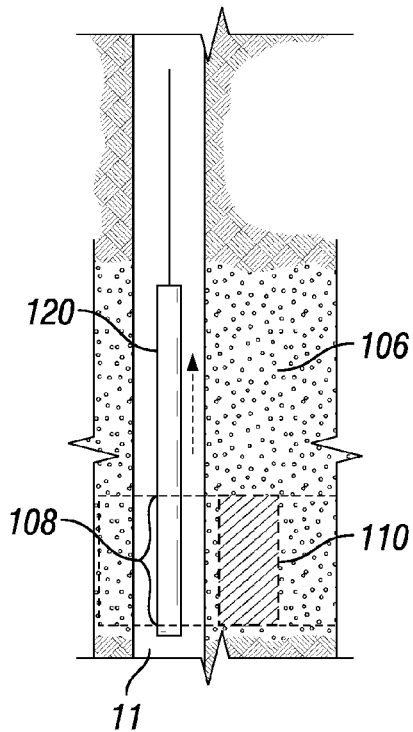
FIGS. 1A-1C are diagrams showing a conventional NMR logging tool disposed within a borehole at three different time periods.
Figure 1B:
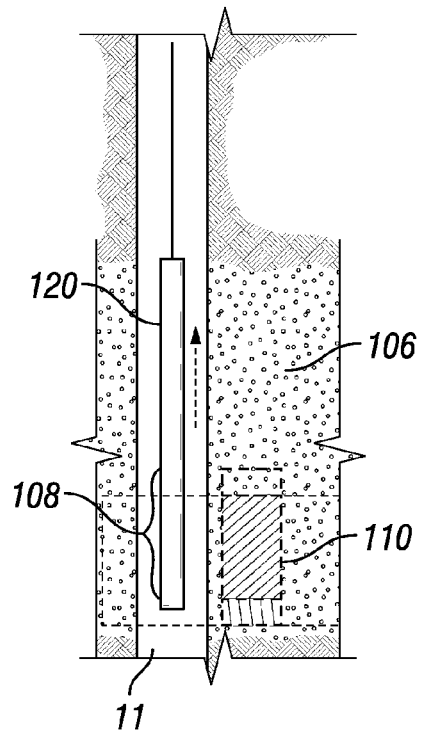
Figure 1C:
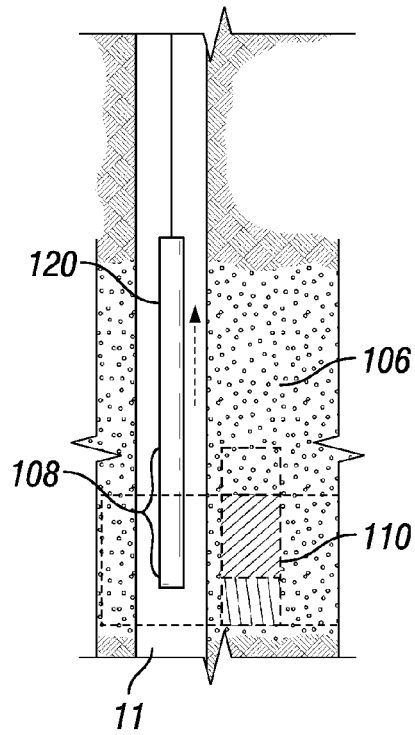
Figure 2:
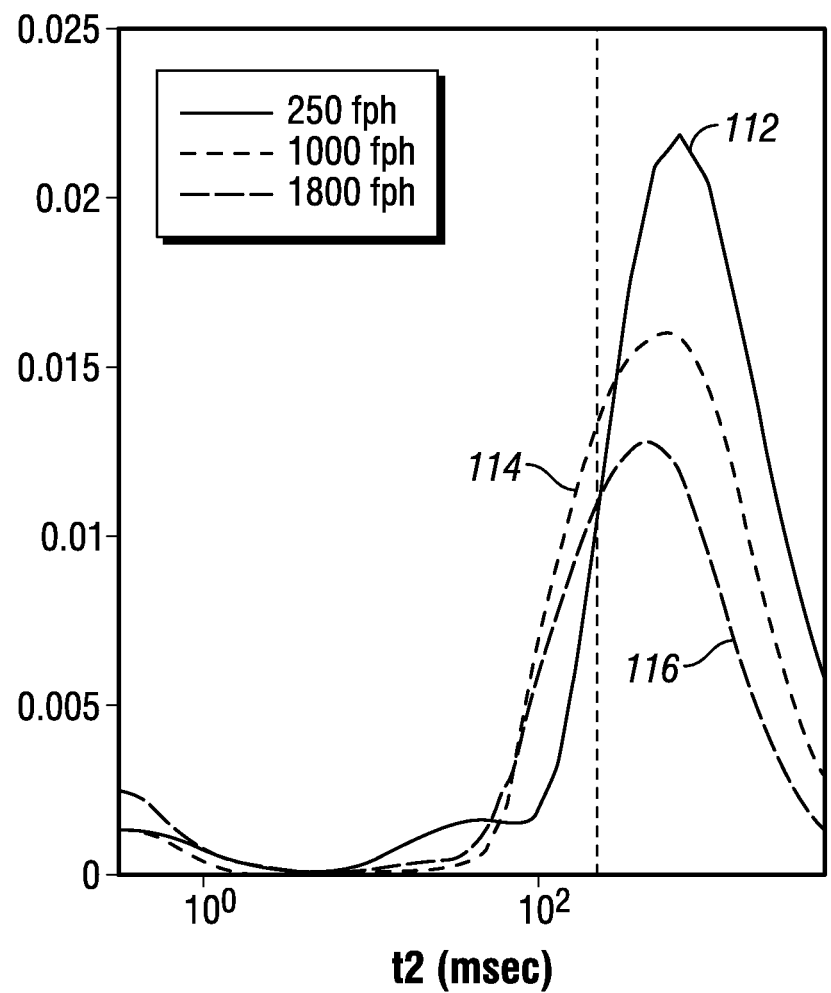
FIG. 2 is a graph depicting the speed effect of a conventional NMR logging tool at three different speeds.
Figure 3:
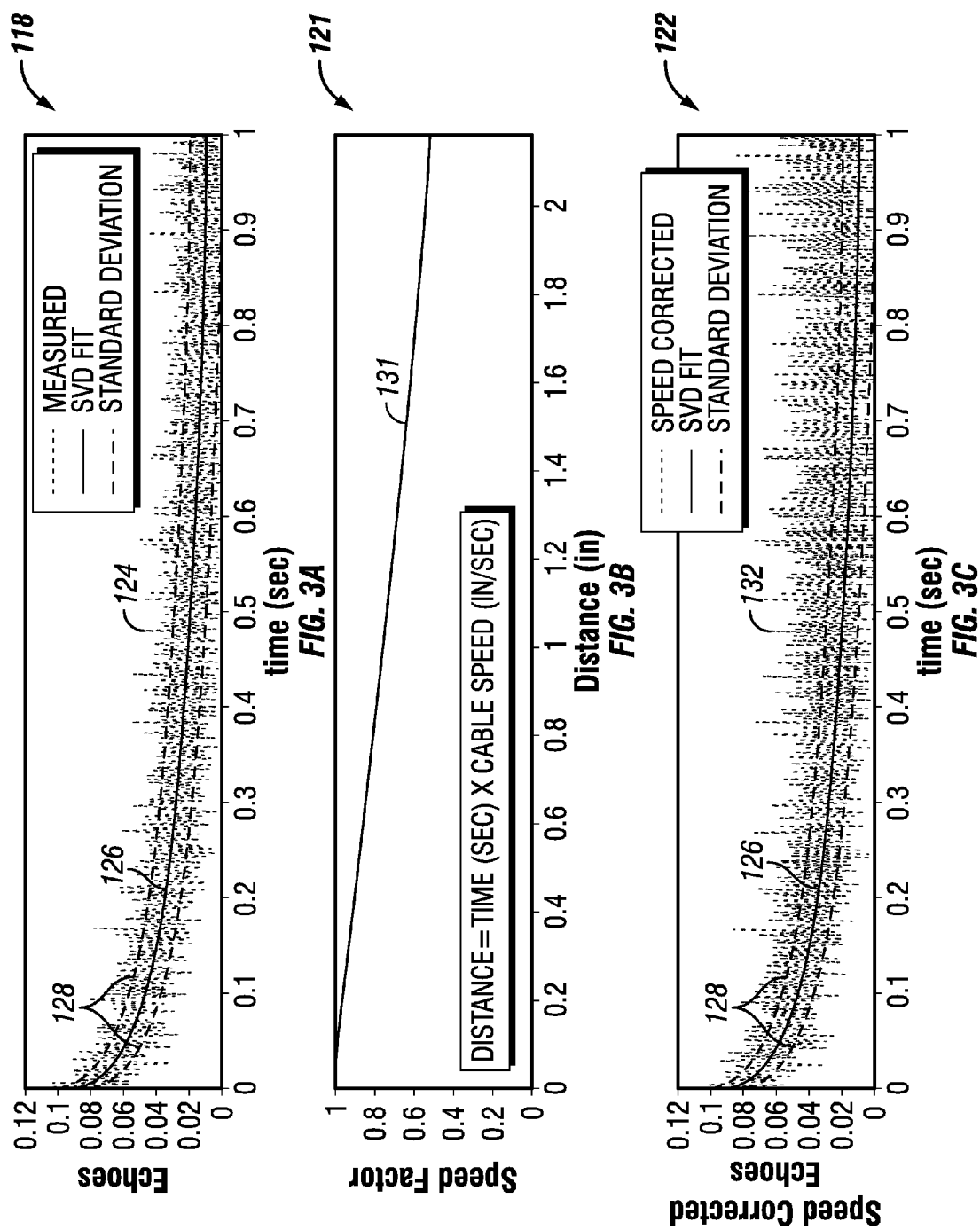
FIG. 3 is a set of three graphs illustrating the effect of applying a conventional speed correction method.
Figure 6:
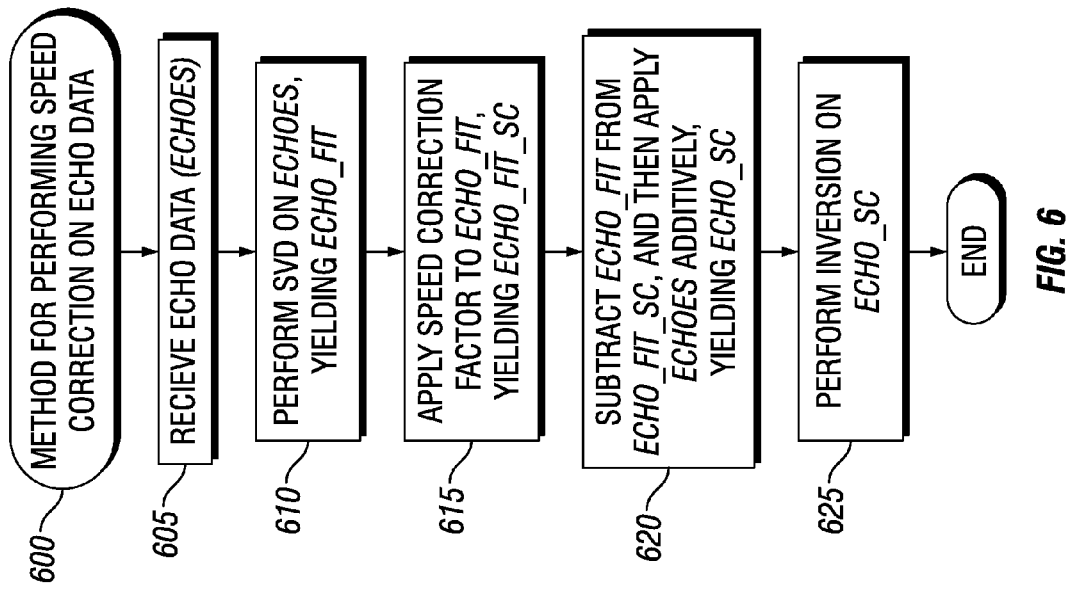
FIG. 6 is a flow chart depicting a method for performing speed correction on echoes, according to an exemplary embodiment.

FIG. 6 is a flow chart depicting a method 600 for performing speed correction on echoes, according to one exemplary embodiment. FIG. 7, which will be discussed as it relates to the steps of FIG. 6, is similar to FIG. 3 but includes three graphs illustrating the effect of applying a speed correction method according to an exemplary embodiment, instead of a conventional speed correction method.

In step 605 of FIG. 6, a processor (not shown) in communication with the tool 120 receives echo data or echoes 124 (i.e., data measured by the tool 120 that indicates the echoes 124 resulting from the tool's 120 interaction with the formation 106 or sample). This step 605 can be performed according to conventional methods that may be recognized by one of ordinary skill in the art having benefit of the present disclosure. In various exemplary embodiments, the processor can be disposed within the tool 120 itself, can be at another location downhole, or can be located at the surface. The processor can communicate with the tool 120 and its NMR sensors by any suitable method, as may be recognized by one of ordinary skill in the art. For example, there may be a physical connection providing a communication link between the NMR sensors and the processor. Alternatively, if the processor is located at the surface and there is no direct physical connection with the tool 120, any of various telemetry methods (e.g., mud pulse) can be used to communicate between the processor and the NMR sensors of the tool 120.

In step 610, the processor performs SVD (single value decomposition) on the echoes 124 received in step 605, thereby yielding echo_fit 126, which is a fit based on the received echoes. SVD involves taking the kernel (K) relating echoes and $T_2$ distribution and expanding it as:

$$\text{echoes} = K * T_{2dist} = U * S * V^T * T_{2dist},$$

where U and V are orthonormal basis matrices and S is a diagonal matrix of non-negative real numbers. In the above equation * stands for the matrix dot operator and $T_{2dist}$ stands for the $T_2$ distribution. A representation of echo_fit 126 is described by:

$$\text{echo\_fit} = U * U^T * \text{echoes}.$$

The use of SVD to obtain a fit of echoes is discussed in U.S. Pat. Nos. 5,363,041 and 5,596,274 to Sezginer et al., the entire disclosures of which are hereby incorporated by reference.

In various alternative embodiments, as may be recognized by one of ordinary skill in the art having benefit of the present disclosure, various methods for inverting the echoes 124 may be used instead of performing SVD, such as performing a complete inversion to obtain echo_fit. Such alternative embodiments may be able to produce more accurate results in certain circumstances, but may be far more computational intensive (and thus slower).

In step 615, the processor applies a speed correction factor to echo _fit, thereby yielding echo_fit_sc 134. The speed correction factor applied to echo_fit 126 in step 615 can be represented as follows:

$$\text{echo\_fit\_sc} = \text{echo\_fit} * \text{correction},$$

where "correction" is the speed correction factor 131. In various exemplary embodiments, the "*" operator can represent any multiplicative operation for applying the correction to echo _fit, such as a matrix dot operator, or simple multiplication or division of each point. In one embodiment, the speed correction factor 131 can be calculated by modeling the resonant region 110 of a moving tool 120 to determine the correction factor needed to bring its response to that of a stationary tool. Subsequently, in certain embodiments, the correction factor then may be refined with actual data. In other embodiments, the speed correction factor 131 can be determined according to various conventional methods and then applied to echo _fit 126. One example of the correction 131 is shown in the first graph 133 in FIG. 7, which is identical to the correction used in FIG. 3 and discussed above. The second graph 135 in FIG. 7 shows both echo _fit 126 and echo _fit sc 134 according to the example.

In step 620, the processor then determines the difference between echo_fit_sc 134 and echo_fit 126, and then applies this difference additively to the original echoes 124, thereby yielding a speed-corrected version of the echoes 136. In other words, in step 620, echo_fit 126 (the SVD fit of the original echoes) is subtracted from echo_fit_sc 134 (echo_fit with the speed correction multiplicatively applied). In an exemplary embodiment, the difference between echo_fit_sc and echo_fit can be interpolated for all of the echo data (i.e., for each point in the original echoes).

The difference between echo_fit_sc and echo_fit represents an additive correction factor that can be additively applied to the original echoes 124. These corrected echoes 136, as corrected by the exemplary speed correction, are shown in the third graph 137 of FIG. 7. An advantage of applying the multiplicative speed correction factor 131 to echo_fit 126—instead of the echoes 124 themselves, as is done in conventional methods—is that the noise present in the echoes will not be inadvertently multiplied by the speed correction factor. Applying the difference between echo_fit_sc and echo_fit as an additive correction factor to echoes may not materially affect the noise present in the echoes. This difference is evident from a comparison of the third graphs 122, 137 of FIGS. 3 and 7.

In step 625, an inversion of echo_sc is performed. As may be recognized by one of ordinary skill in the art having benefit of the present disclosure, and as discussed previously, the inversion can be used in analyzing and evaluating the formation 106 and/or sample, by, for example, providing guidance as to the presence, absence, and/or location of hydrocarbons present. After step 625, the method 600 ends.

As to the exemplary methods and steps described in the embodiments presented previously, they are illustrative, and, in alternative embodiments, certain steps can be performed in a different order, in parallel with one another, omitted entirely, and/or combined between different exemplary methods, and/or certain additional steps can be performed, without departing from the scope and spirit of the invention. Accordingly, such alternative embodiments are included in the invention described herein.

The invention can comprise a computer program that embodies the functions described herein and illustrated in the flow charts. However, it should be apparent that there could be many different ways of implementing the invention in computer or algorithmic programming, and the invention should not be construed as limited to any one set of program instructions. Further, a skilled programmer would be able to write such a program to implement an embodiment of the disclosed invention based on the flow charts and associated description in the application text. Therefore, disclosure of a particular set of program code instructions is not considered necessary for an adequate understanding of how to make and use the invention.

The invention can be used with computer hardware and software that performs the methods and processing functions described above. Specifically, in describing the functions, methods, and/or steps that can be performed in accordance with the invention, any or all of these steps can be performed by using an automated or computerized process. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

What is claimed is:

1. A method which corrects nuclear magnetic resonance (NMR) logging data comprising the steps of:
    acquiring a set of echo data comprising a plurality of echo points using an NMR logging tool;
    applying a multiplicative correction factor to the acquired echo data comprising a plurality of echo points using a multiplicative operation in order to obtain a corrected fit;
    determining a fit of the echo data, wherein the fit of the echo data is determined by performing a single value decomposition (SVD) on the echo data;
    applying a speed correction factor to the fit of echo data using a multiplicative operation in order to obtain a corrected fit;
    determining a difference between the fit and the corrected fit; and
    applying additively the difference between the fit and the corrected fit to the echo data in order to yield additively-corrected echo data;
    wherein the speed correction factor is determined as that which brings the response of the NMR logging tool while moving within a resonant region to that of the NMR logging tool while stationary.

2. The method of claim 1, wherein the step of determining a difference between the fit and the corrected fit comprises the step of interpolating a difference between the fit and the corrected fit for each echo point on the set of echo data.

3. The method of claim 1, wherein the multiplicative operation comprises at least one of a matrix dot operation, simple multiplication, or division.

4. The method of claim 1, wherein the amount of noise in the set of echo data is substantially the same as the amount of noise in the additively-corrected echo data.

5. The method of claim 1, wherein the fit of the echo data comprises an inversion of the echo data.

6. The method of claim 1, further comprising the step of inverting the additively-corrected echo data.

7. An apparatus configured for analyzing an NMR characteristic of the formation, the apparatus comprising:
    an NMR tool configured for receiving a set of echo data comprising a plurality of echo points from the formation;
    a first processor in communication with the NMR tool in order to determine a fit of the echo data by performing singular value decomposition (SVD) on the set of echo data and apply a speed correction factor to the fit of the echo data using a multiplicative operation in order to obtain a corrected fit;
    a second processor in communication with the first processor in order to determine a difference between the fit and the corrected fit; and
    a third processor in communication with the second processor in order to apply additively the difference between the fit and the corrected fit to the echo data in order to yield the additively-corrected echo data.

8. The apparatus of claim 7, wherein a single processor comprises at least two of the first processor, the second processor, and the third processor.

9. The apparatus of claim 7, wherein a single processor comprises the first processor, the second processor, and the third processor.

10. The apparatus of claim 7, wherein at least one of the first processor, second processor, and third processor is located at a surface location.

11. The apparatus of claim 7, wherein at least one of the first processor, second processor, and third processor is located downhole.

12. The apparatus of claim 8, wherein the second processor determines the difference between the fit and the corrected fit by interpolating a difference between the fit and the corrected fit for each echo point.

13. The apparatus of claim 7, wherein the speed correction factor is determined by modeling a resonant region associated with the NMR logging tool while the NMR logging tool is moving and determining the speed correction factor as that which brings the response of the moving NMR logging tool to that of the NMR logging tool when stationary.

14. A non-transitory computer-readable medium having computer-readable instructions embodied therein that corrects NMR logging data, the non-transitory computer readable medium instructions comprising:
- non-transitory computer readable instructions that determine a fit of a set of acquired echo data comprising a plurality of echo points, wherein the fit of the echo data is determined by performing a single value decomposition (SVD) on the echo data;
- non-transitory computer-readable instructions that cause a speed correction factor to be applied to the fit of the echo data using a multiplicative operation to determine a corrected fit;
- non-transitory computer readable instructions that determine a difference between the fit and the corrected fit; and
- non-transitory computer readable instructions that additively apply the difference between the fit and the corrected fit to the echo data in order to yield additively-corrected echo data.

15. The non-transitory computer-readable medium of claim 14, wherein the non-transitory computer readable instructions that determine the difference between the fit and the corrected fit comprise computer-readable instructions that interpolate a difference between the fit and the corrected fit of each echo point.

16. The non-transitory computer-readable medium of claim 14, wherein the fit of the echo data comprises an inversion of the echo data.

17. The non-transitory computer-readable medium of claim 14, wherein the non-transitory computer-readable instructions embodied in the non-transitory computer-readable medium further comprise computer-readable instructions in order to invert the additively-corrected echo data.

18. The non-transitory computer-readable medium of claim 14, wherein the non-transitory computer readable medium is accessed by a computer located at a surface location.

* * * * *